(12) United States Patent
Chew et al.

(10) Patent No.: US 7,472,817 B2
(45) Date of Patent: Jan. 6, 2009

(54) SOLDERS

(75) Inventors: Kai Hwa Chew, Singapore (SG);
Vincent Yue Sern Kho, Singapore (SG)

(73) Assignees: Quantum Chemical Technologies (Singapore) Pte. Ltd, Singapore (SG);
Singapore Asahi Chemical & Solder Industries Pte., Singapore (SG)

( * ) Notice: Subject to any disclaimer, the term of this patent is extended or adjusted under 35 U.S.C. 154(b) by 171 days.

(21) Appl. No.: 11/674,075

(22) Filed: Feb. 12, 2007

(65) Prior Publication Data

US 2007/0125834 A1 Jun. 7, 2007

Related U.S. Application Data

(63) Continuation of application No. 11/046,417, filed on Jan. 28, 2005, now abandoned.

(30) Foreign Application Priority Data

Apr. 27, 2004 (GB) .................. 0423860.6

(51) Int. Cl.
*B23K 31/02* (2006.01)
*C22C 13/00* (2006.01)
(52) U.S. Cl. .................. 228/101; 420/557; 420/560
(58) Field of Classification Search .................. None
See application file for complete search history.

(56) References Cited

U.S. PATENT DOCUMENTS

| 4,858,816 A | 8/1989 | Gontier |
| 5,520,752 A | 5/1996 | Lucey |
| 5,538,686 A | 7/1996 | Chen |
| 5,733,501 A | 3/1998 | Takao et al. |
| 5,958,333 A | 9/1999 | Matsunaga |
| 6,843,862 B2 | 1/2005 | Chew |
| 7,282,175 B2 * | 10/2007 | Amagai et al. ............... 420/562 |

FOREIGN PATENT DOCUMENTS

| EP | 1468777 | | | 10/2001 |
| GB | 2431412 A | * | | 4/2007 |
| JP | 09-155586 | | | 6/1997 |
| JP | 10314980 | | | 12/1998 |
| JP | 11000791 A | * | | 1/1999 |
| JP | 11221694 | | | 8/1999 |
| JP | 2000141078 | | | 5/2000 |
| JP | 2001058286 | | | 3/2001 |
| JP | 2002248596 | | | 9/2002 |
| JP | 2002373824 | | | 12/2002 |
| WO | WO97/09455 | | | 3/1997 |
| WO | WO97/43456 | | | 11/1997 |
| WO | WO0018536 | | | 6/2000 |

OTHER PUBLICATIONS

International Prel. Exam Report; PCT App. No. PCTIGB02100259, Nov. 28, 2003; 6 pages.
UK Search Report; Related App GB0423860.6; Nov. 12, 2004; 1 page.
Declaration of Inventor Chew under 37 CFR 1 .I32 in App # 091932,793,"Solders".

* cited by examiner

*Primary Examiner*—Kiley Stoner
(74) *Attorney, Agent, or Firm*—Hancock Hughey LLP (57) ABSTRACT

A substantially lead-free solder, comprising: from around 96.8% to around 99.3% tin; from around 0.2% to around 3.0% copper; and from around 0.02% to around 0.12% silicon.

12 Claims, 13 Drawing Sheets

| Solder Composition | Max. Tensile Strength | Load at Max Load | Max.Displacement | Slope (Aut Young) | Modulus (Aut Young) | Max.% Strain | %Strain at Thresh Yield | Stress at offset Yield | Energy to Yield Point | Energy to Break Point | Toughness | Plastic % Strain at Break | Tensile Energy Absorption |
|---|---|---|---|---|---|---|---|---|---|---|---|---|---|
| 63Sn/37Pb | 52,546 | 1.486 | 16,846 | 6535,390 | 4894,349 | 67,363 | 3,321 | 39,266 | 0.164 | 18,964 | 28,567 | 66,966 | 2143,102 |
| 99.3Sn/0.7Cu | 42,217 | 1.194 | 19,464 | 5480,152 | 4845,817 | 77,856 | 5,063 | 33,599 | 0.138 | 19,218 | 27,188 | 78,062 | 2169,498 |
| SnCuNi (NS) | 38,020 | 1.075 | 19,053 | 11257,728 | 9954,015 | 76,332 | 4,414 | 30,206 | 0.076 | 17,944 | 25,385 | 76,069 | 2025,584 |
| Sn/0.7Cu/0.02Si | 45,830 | 1.296 | 17,040 | 5768,398 | 5100,380 | 68,161 | 4,703 | 28,780 | 0.203 | 18,053 | 25,539 | 65,644 | 2037,940 |
| Sn/0.7Cu/0.04Si | 35.5 | 1.004 | 18,504 | 10821,284 | 9588,113 | 66,018 | 3,691 | 28,005 | 0.065 | 13,484 | 19,076 | 65.1 | 1522,164 |
| Sn/0.7Cu/0.06Si | 35,091 | 0.992 | 16,324 | 8837,868 | 7814,39 | 65,297 | 4,046 | 27,801 | 0.076 | 13,44 | 19,014 | 64.62 | 1517,225 |
| Sn/0.7Cu/0.08Si | 29,688 | 1.811 | 16,338 | 9671,262 | 8551,271 | 65,352 | 3,767 | 21,455 | 0.047 | 11,28 | 15,958 | 65,062 | 1273,378 |
| Sn/0.7Cu/0.10Si | 32,47 | 0.918 | 16,743 | 3934,965 | 3479,272 | 68,972 | 4,466 | 25,077 | 0.118 | 13,059 | 18,475 | 68.02 | 1471,223 |
| Sn/0.7Cu/0.12Si | 30,912 | 0.874 | 18,557 | 8956,741 | 8715,271 | 74,228 | 3,795 | 23,695 | 0.054 | 13,713 | 19.4 | 73,232 | 1848.09 |

Mechanical Properties of SnCuX alloy with varies amount of Si (0.02 – 0.12%) in comparison with 63Sn/37Pb, Sn/0.7Cu and Sn/0.7Cu/Ni
Load Cell: 100kN Crosshead Speed: 3mm/min

| Alloy | UTS (MPa) | | | YS (MPa) | | | Strain (%) | | |
|---|---|---|---|---|---|---|---|---|---|
| | Temp (°C) | | | Temp (°C) | | | Temp (°C) | | |
| | 23 | 75 | 125 | 23 | 75 | 125 | 23 | 75 | 125 |
| 63Sn/37Pb | 52.548 | 26.849 | 15.117 | 39.286 | 21.978 | 11.215 | 67.383 | 58.231 | 65.906 |
| 99.3Sn/0.7Cu | 42.217 | 31.003 | 21.684 | 33.599 | 26.269 | 19.414 | 77.856 | 64.590 | 62.553 |
| Sn/0.7Cu/0.02Si | 45.830 | 29.744 | 21.522 | 38.780 | 26.416 | 19.221 | 68.161 | 68.736 | 77.888 |

| Alloy | Energy to yield (J) | | | Energy to break (J) | | | Toughness (Mpa) | | |
|---|---|---|---|---|---|---|---|---|---|
| | Temp (°C) | | | Temp (°C) | | | Temp (°C) | | |
| | 23 | 75 | 125 | 23 | 75 | 125 | 23 | 75 | 125 |
| 63Sn/37Pb | 0.164 | 0.059 | 0.027 | 18.984 | 7.770 | 3.919 | 26.857 | 10.992 | 5.545 |
| 99.3Sn/0.7Cu | 0.136 | 0.064 | 0.044 | 19.218 | 11.845 | 7.836 | 27.188 | 16.757 | 11.086 |
| Sn/0.7Cu/0.02Si | 0.203 | 0.066 | 0.043 | 18.053 | 11.996 | 8.976 | 25.539 | 16.971 | 12.698 |

: Mechanical properties of SnCu +Si with SnCu and SnPb alloy subjected to high temperature of 75degC and 125degC during the test.
Load cell: 100kN. Crosshead speed: 3mm/min

Figure 10

| Alloy | UTS (MPa) | | | YS (MPa) | | | Strain (%) | | |
|---|---|---|---|---|---|---|---|---|---|
| | 1 | 3 | 5 | 7 | 1 | 3 | 5 | 7 | |
| 63Sn/37Pb | 41.805 | 52.548 | 46.526 | 43.278 | 33.913 | 39.286 | 40.148 | 35.396 | |

| | 1 | 3 | 5 | 7 | 1 | 3 | 5 | 7 |
|---|---|---|---|---|---|---|---|---|
| 63Sn/37Pb | 41.805 | 52.548 | 46.526 | 43.278 | 33.913 | 39.286 | 40.148 | 35.396 |
| 99.3Sn/0.7Cu | 34.254 | 42.217 | 35.776 | 35.082 | 27.608 | 33.599 | 26.873 | 25.537 |
| Sn0.7Cu/0.02Si | 38.737 | 45.830 | 35.504 | 37.702 | 31.469 | 38.780 | 27.822 | 30.678 |

| Alloy | Energy to yield (J) | | | | Energy to break (J) | | | | Toughness (Mpa) | | | |
|---|---|---|---|---|---|---|---|---|---|---|---|---|
| | 1 | 3 | 5 | 7 | 1 | 3 | 5 | 7 | 1 | 3 | 5 | 7 |
| 63Sn/37Pb | 0.097 | 0.164 | 0.124 | 0.122 | 15.310 | 18.984 | 15.192 | 17.181 | 21.659 | 26.857 | 21.492 | 24.306 |
| 99.3Sn/0.7Cu | 0.060 | 0.136 | 0.063 | 0.072 | 12.245 | 19.218 | 15.364 | 15.772 | 17.324 | 27.188 | 21.736 | 22.313 |
| Sn0.7Cu/0.02Si | 0.071 | 0.203 | 0.067 | 0.113 | 16.771 | 18.053 | 14.724 | 16.493 | 23.727 | 25.539 | 20.830 | 23.333 |

Mechanical Properties of SnCu + Si with SnCu and SnPb as comparison in different strain rate.
Load Cell: 100kN

SOLDERS

TECHNICAL FIELD

This invention relates to solders and, in particular to solders which are substantially lead-free.

BACKGROUND

Many conventional solders contain lead as a major constituent thereof. Such solders often have desirable physical properties, and the use of lead- containing solders is widespread throughout several industries, including those concerned with the production of printed circuit boards.

There are, however, increasing demands for lead-free solders due, for example, to environmental considerations, and it seems likely that, within the next few years, it will be a legal requirement in several countries for solders used in the manufacture of many items to contain little or no lead.

One type of alloy that has been used as a replacement for the conventional tin-lead solders are tin-copper alloys, and an alloy consisting of 99.3% tin and 0.7% copper has become relatively widely used in certain industries. However, the properties of such a tin-copper alloy are less desirable than those of the conventional tin-lead alloy, and in particular the tin-copper alloy exhibits a lower strength, a lower fatigue resistance and a higher eutectic temperature than the conventional tin-lead alloy.

This is particularly undesirable, since many industrial machines and processes are configured to work effectively with the conventional tin-lead alloy, and ideally a lead-free solders replacement should be capable of being used with the same machines and processes without significant modification thereof. Many manufacturers have, however, found that existing soldering processes must now be significantly adapted to accommodate the use of lead- free solders, and this adaptation of processes and materials is widely regarded as a poor use of resources, particularly as the standard of articles manufactured using known lead-free solders is often considerably below that achievable using conventional leaded solders.

SUMMARY OF THE INVENTION

It is an object of the present invention to seek to provide an improved lead-free solder.

Accordingly, one aspect of the present invention provides a substantially lead-free solder, comprising: from around 96.8% to around 99.3% tin; from around 0.2% to around 3.0% copper; and from around 0.02% to around 0.12% silicon.

Advantageously, the solder further comprises from around 0.005% to around 0.01% phosphorous.

Preferably, the solder comprises around 0.01% phosphorous.

Conveniently, the solder further comprises from around 0.005% to around 0.01% germanium.

Advantageously, the solder comprises around 0.01% germanium.

Preferably, the solder comprises: around 0.7% copper; and around 0.02% silicon.

Another aspect of the present invention provides a method of preparing a substantially lead-free solder, comprising the step of mixing tin, copper and silicon such that: the proportion of tin in the solder is from around 96.8% to around 99.3%; the proportion of copper in the solder is from around 0.2% to around 3.0%; and the proportion of silicon in the solder is from around 0.02% to around 0.12%.

Conveniently, the method further comprises the step of including from around 0.005% to around 0.01% phosphorous in the solder mixture.

Advantageously, the method comprises the step of including around 0.01% phosphorous in the solder mixture.

Preferably, the method further comprises the step of including from around 0.005% to around 0.01% germanium in the solder mixture.

Conveniently, the method comprises the step of including around 0.01% germanium in the solder mixture.

Advantageously, the method comprises the step of including around 0.7% copper and around 0.02% silicon in the solder mixture.

A further aspect of the present invention provides a method of soldering, comprising the step of using a substantially lead-free solder comprising: from around 96.8% to around 99.3% tin; from around 0.2% to around 3.0% copper; and from around 0.02% to around 0.12% silicon.

Preferably, the method comprises using a solder having from around 0.005% to around 0.01% phosphorous.

Conveniently, the method comprises using a solder having around 0.01% phosphorous.

Advantageously, the method comprises using a solder having from around 0.005% to around 0.01% germanium.

Preferably, the method comprises using a solder having around 0.01% germanium.

Conveniently, the method comprises using a solder having around 0.7% copper and around 0.02% silicon.

BRIEF DESCRIPTION OF THE DRAWINGS

In order that the present invention may be more readily understood, embodiments thereof will now be described, by way of example, with reference to the accompany figures, in which:

FIGS. 10 and 11 are tables showing mechanical properties of various alloys;

DETAILED DESCRIPTION

With regard to tin-copper solder alloys as discussed above, it has been found that the addition of a small percentage of silicon to the alloy significantly improves the properties and performance of the alloy. In particular, it has been found that the addition of around 0.02% to 0.12% by weight of silicon to the alloy will strengthen the alloy, and also confer, among others, improved ductility and strain properties on the alloy.

It is thought that these desirable properties might arise due to the valency of silicon, which allows it to form a tethrahedal silicide structure, resulting in a polymeric chain structure of a solid solution, thus given rise to an improved strain percentage.

Figure 1:
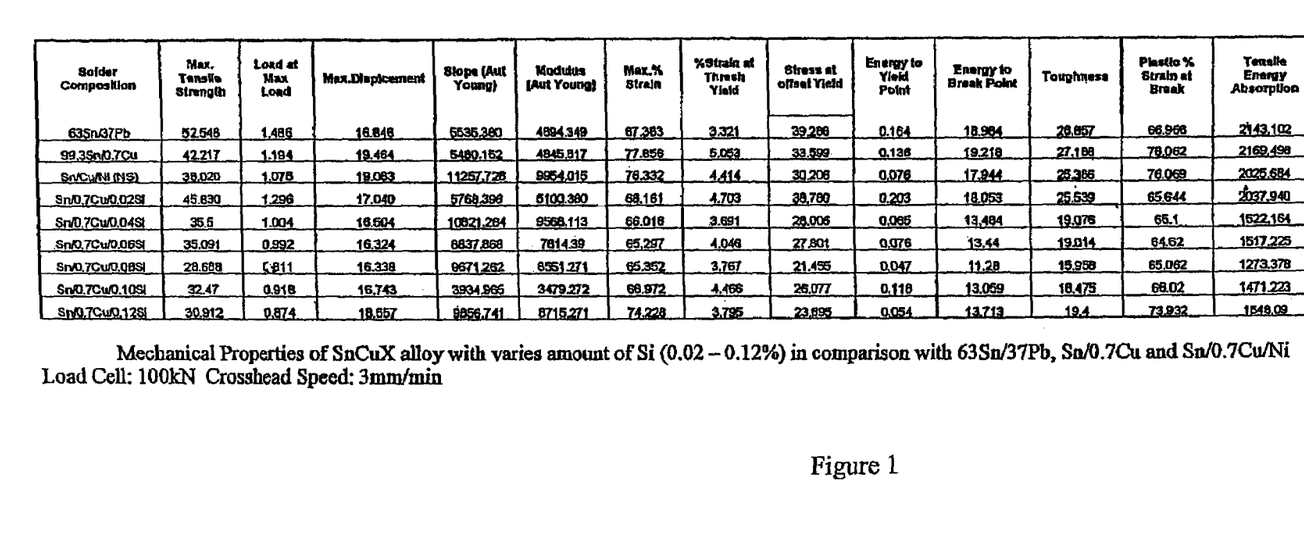
FIG. 1 is a comparative table of mechanical properties of various alloys.

FIG. 1 is a table showing various mechanical properties of certain solders, namely the conventional 63% tin/37% lead solder, a 99.3% tin/0.7% copper solder, a known tin/copper/nickel solder and six further solders comprising a base of tin, 0.7% copper and, respectively 0.02% silicon, 0.04% silicon, 0.06% silicon 0.08% silicon, 0.10% silicon and 0.12% silicon.

It can be seen from FIG. 1 that the physical properties exhibited by the tin/copper/silicon solders embodying the present invention are generally superior to those displayed by the 99.3% tin/0.7% copper solder, and also approximate more closely to the properties displayed by the conventional 63% tin/37% lead solder. In many cases, the tin/0.7% copper/ 0.02% silicon solder represents the closest approximation to the properties to the conventional 63% tin, 37% lead solder, and it is envisaged that this solder may be a strong candidate for direct, "drop-in" replacement for this conventional solder.

Figure 2:
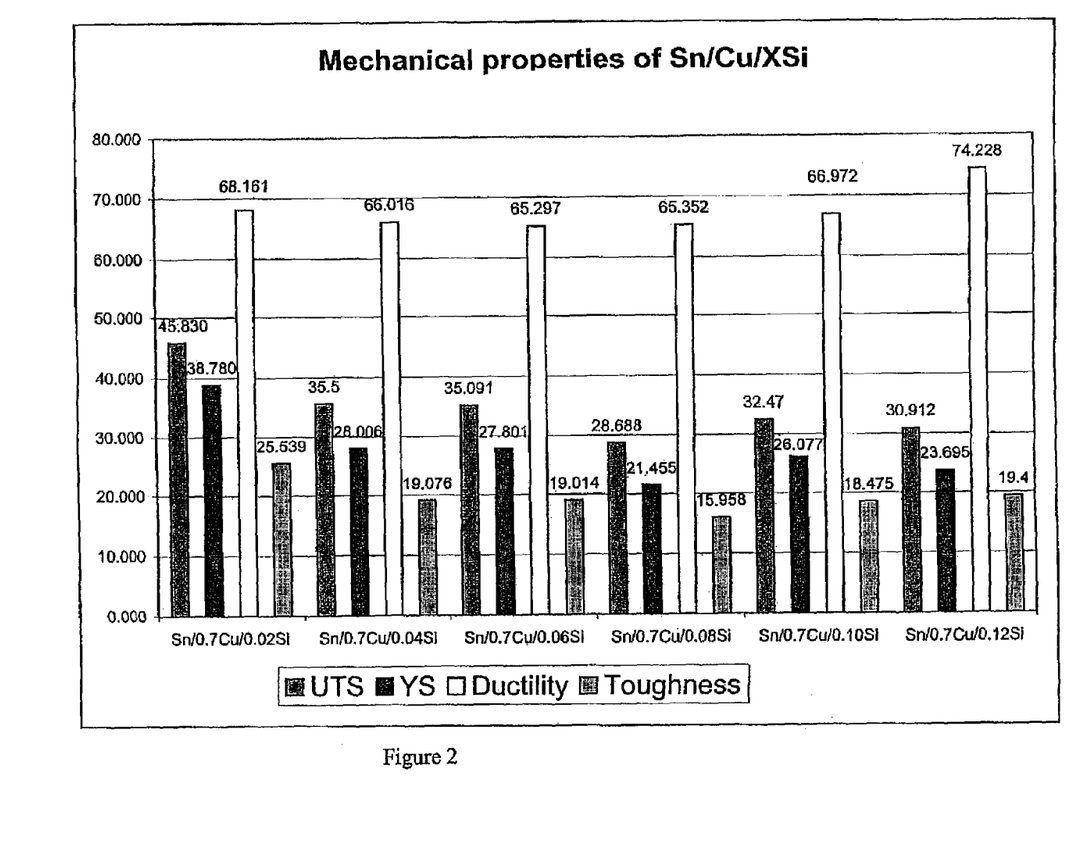
FIG. 2 is a chart of mechanical properties of various alloys.

FIG. 2 is a graph showing selected quantities from the table of FIG. 1, and in particular showing how these quantities vary with the quantity of silicon that is added to a tin/copper solder base to form a solder embodying the present invention. It can be seen that the majority of these properties are at their maximum when the proportion of silicon in the tin/copper solder base is about 0.02%.

It will be seen from FIGS. 1 and 2 that the addition of 0.02% to 0.12% silicon to the tin/copper alloy leads to significant improvement in the tensile strength of the alloy, resulting in values higher than the conventional tin/copper alloy, and also that of the conventional tin/lead alloy. With this increase in tensile strength, there is no significant drop in the strain percentage of the tin/copper/silicon alloy, which proves to have excellent ductility when compared with the conventional tin/lead alloy. The energy needed to initiate a crack in the alloy is also significantly greater than that required to initiate a crack in the conventional tin/lead alloy, and in the conventional tin/copper alloy The properties of the tin/copper/silicon alloys described above can be further strengthened or improved by the addition of a small quantity of germanium or phosphorous thereto. In particular, the addition of around 0.005% to 0.01% of either of these elements leads to desirable results, including increased strength and the provision of an antioxidant effect.

Figure 3:
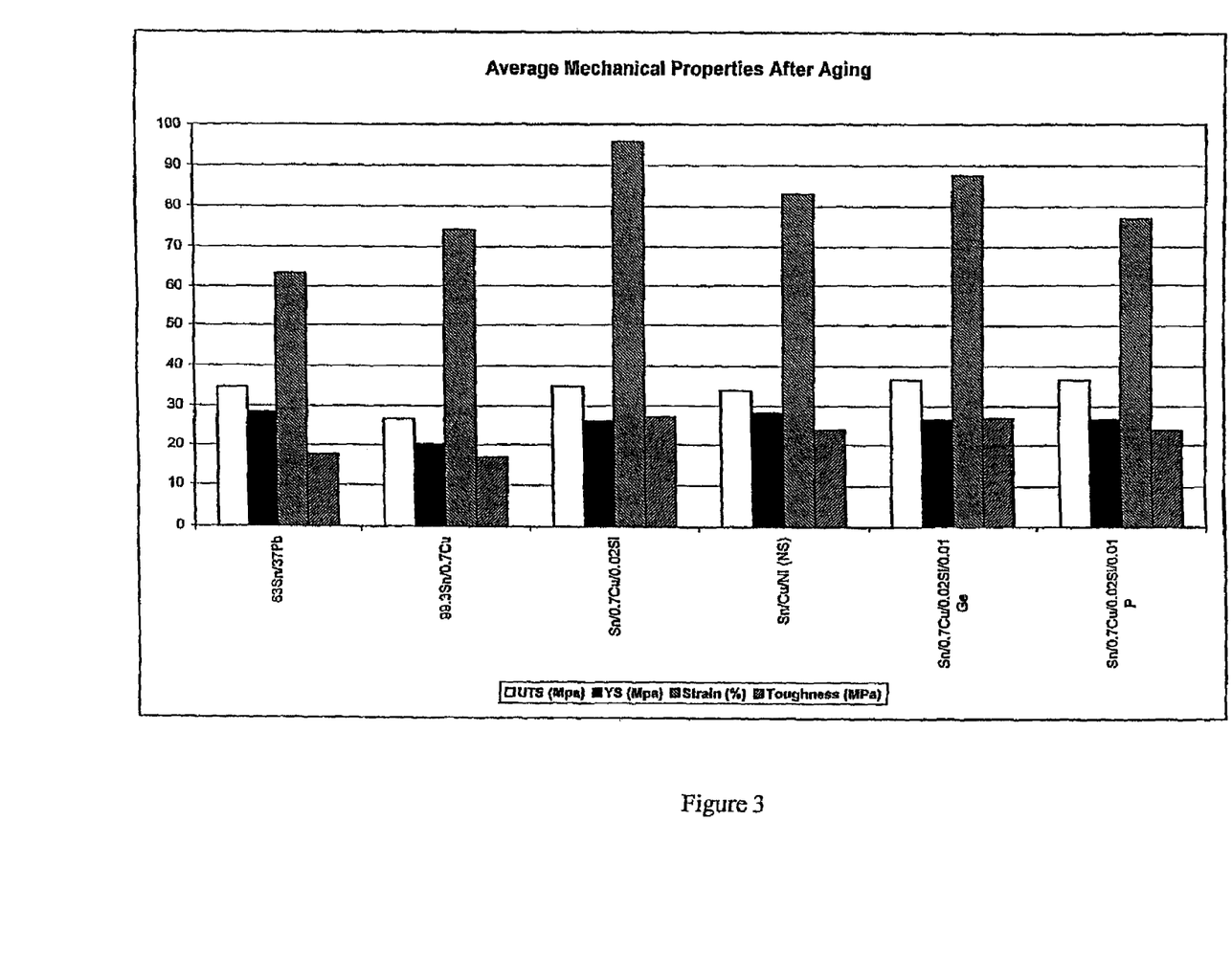
FIG. 3 is a chart showing mechanical properties of various alloys after being subjected to an ageing process.

Turning to FIG. 3, this figure shows a graph of mechanical properties of alloys after undergoing an ageing process, in which the alloys are subjected to a temperature of 125° C. for 96 hours. This test was conducted to discover how the properties of the alloy would change if an article manufactured using the alloy was to be subjected to such high temperatures for extended periods of time. It will be seen that an alloy containing a tin base, 0.7% copper, 0.02% silicon and 0.01% germanium, as well as an alloy containing a tin base, 0.7% copper, 0.02% silicon and 0.01% phosphorous, display a superior UTS (ultimate tensile strength) than the conventional tin/0.7% copper/0.02% silicon alloy. A skilled person will appreciate that these alloys will therefore display an increased resistance towards thermal fatigue or creep with time, and that products manufactured using solders as described above containing germanium or phosphorous will maintain desirable physical and mechanical properties over extended periods of time.

Figure 4:
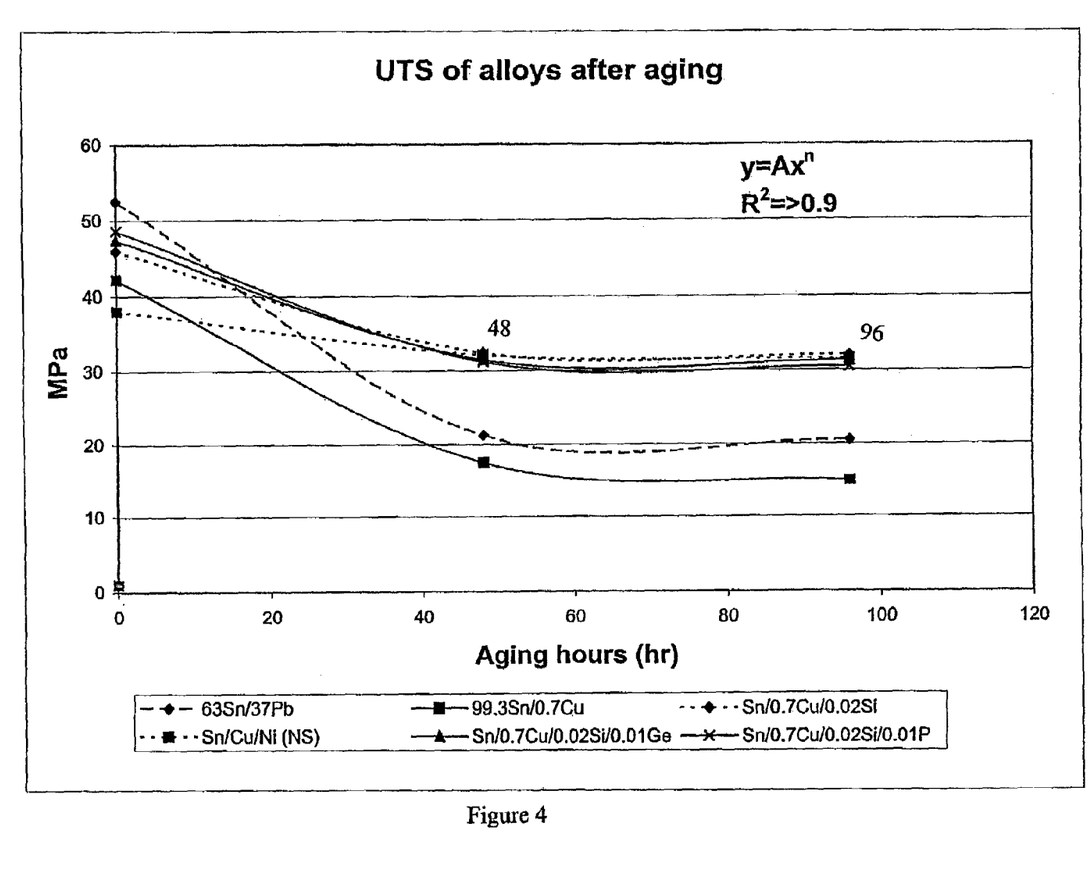
FIG. 4 is a graph showing the tensile strength of various alloys after being subjected to ageing processes of varying lengths.

FIG. 4 shows the tensile strengths of various alloys after undergoing an ageing process, in which the alloys were subjected to a temperature of 125° C. for 24, 48 and 96 hours. It can be seen that alloys embodying the present invention display superior tensile strength after ageing, when compared to the conventional tin/lead alloy, as well as to the conventional tin/copper alloy.

Figure 5:
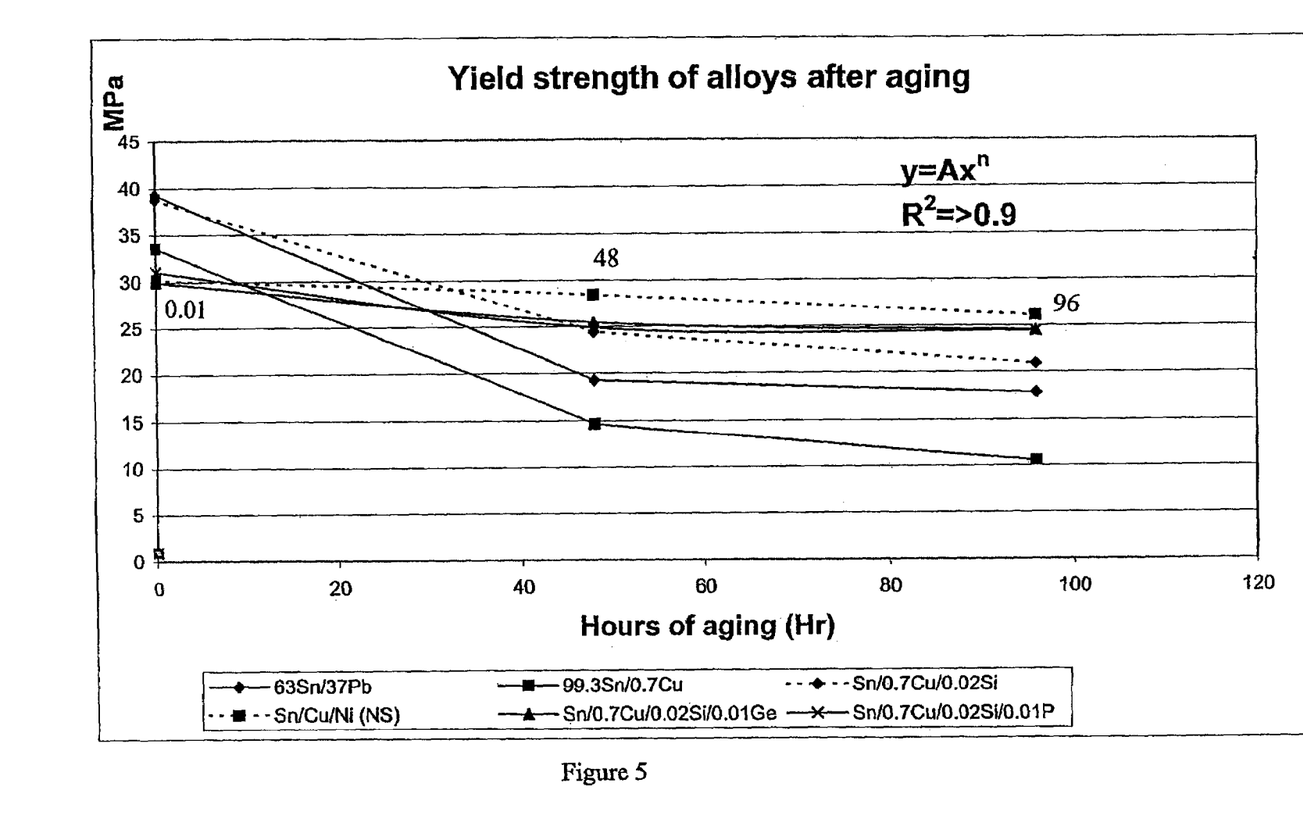
FIG. 5 shows the yield strength of various alloys after being subjected to ageing processes of varying lengths.

FIG. 5 shows the yield strengths of various alloys after being subjected to the above-described ageing process, and again it will be seen that alloys embodying the present invention display superior yield strengths after ageing when compared to the conventional tin/lead and tin/copper alloys. Also, the alloys embodying the present invention containing small amounts of germanium or phosphorous display an improved yield strength after being subjected to significant ageing processes when compared to solders embodying the present invention which do not contain germanium or phosphorous.

Figure 6:
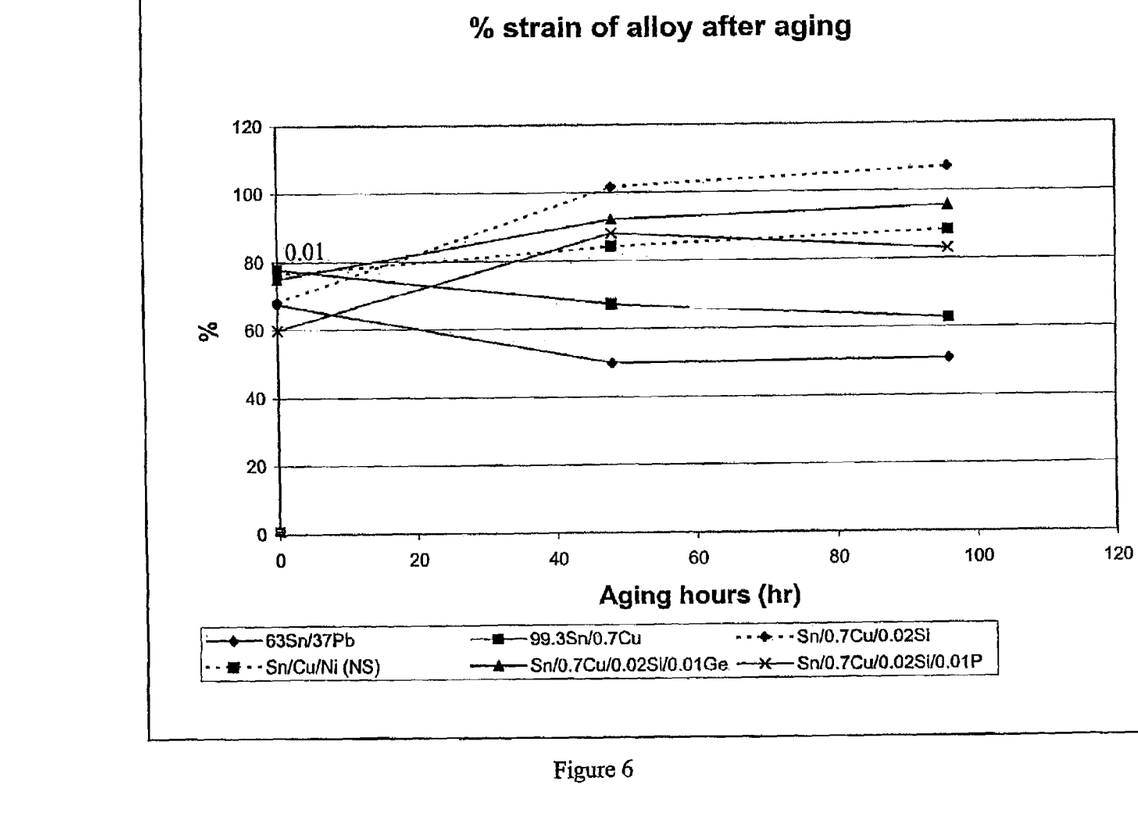
FIG. 6 is a graph showing strain values of various alloys after being subjected to ageing processes of varying lengths.

FIG. 6 shows the strain percentages of various alloys after undergoing the ageing process described above, i.e. being subjected to a temperature of 125° C. for 24, 48 and 96 hours. It can be seen that alloys embodying the present invention display superior strain percentages when compared to the conventional tin/lead solder, and when compared to the conventional tin/copper alloy.

Figure 7:
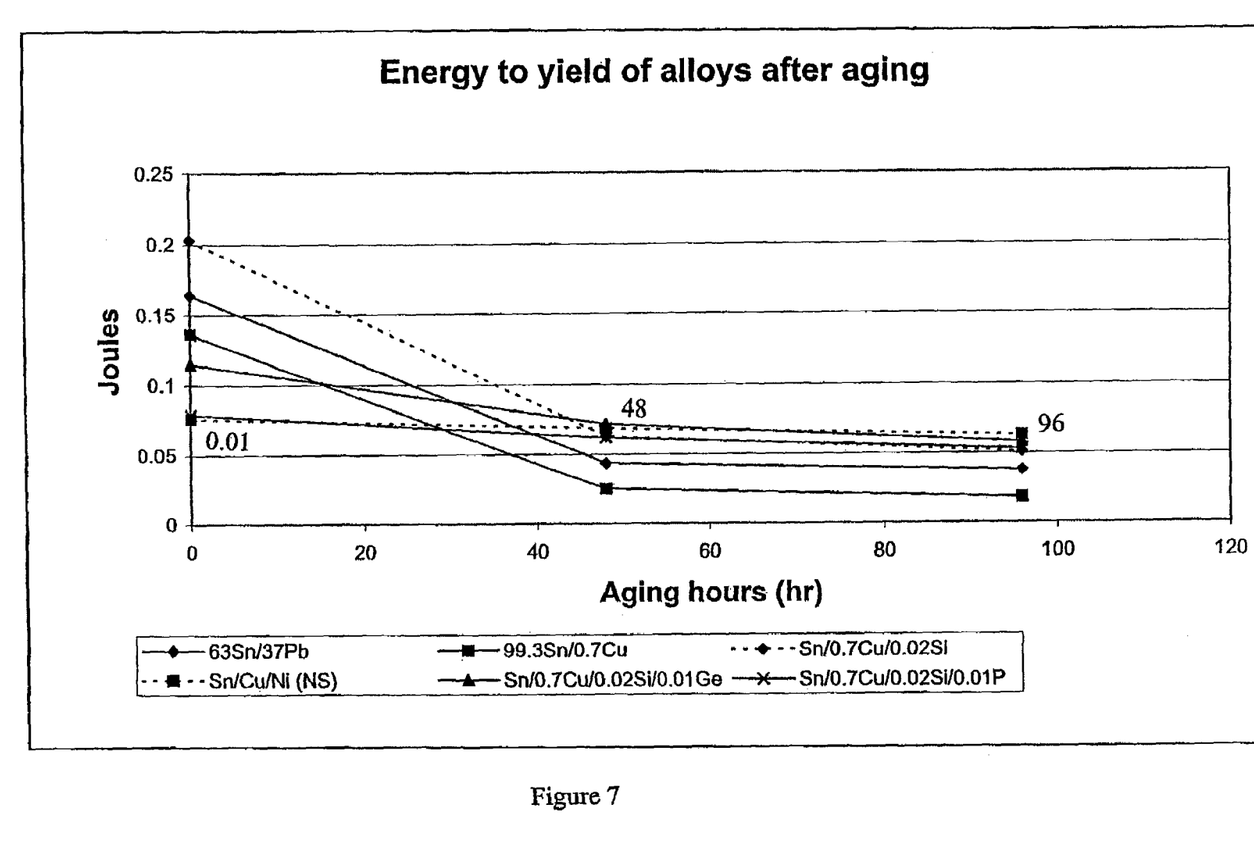
FIG. 7 is a graph showing the quantity of energy required to produce yield in various alloys after being subjected to ageing processes of varying lengths.
Figure 8:
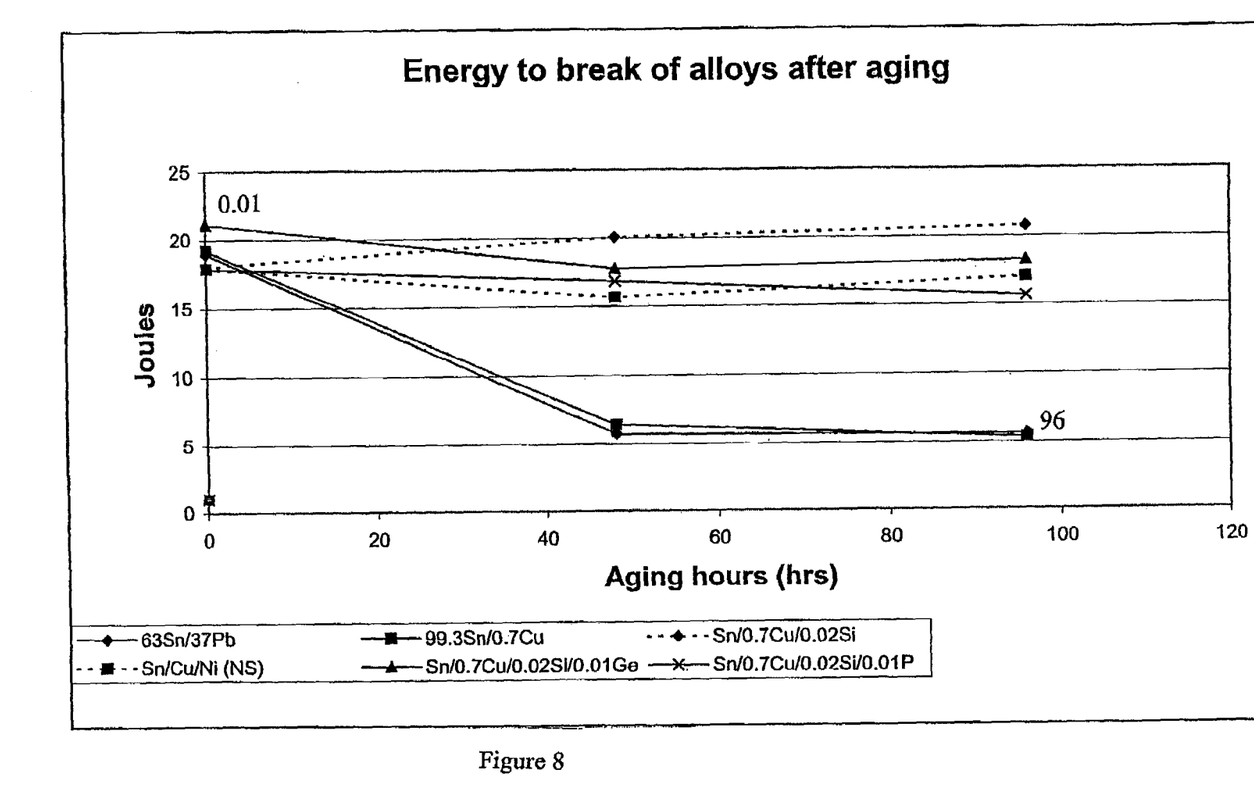
FIG. 8 is a graph showing the quantity of energy required to break various alloys after being subjected to ageing processes of varying lengths.

FIGS. 7 and 8 show the energies required, respectively, for various solders to yield and to break, after being subjected to the ageing process described above. It can again be seen that alloys embodying the present invention require greater quantities of energy to yield and to break when compared to the conventional tin/lead solder, and when compared to the conventional tin/copper solder. In particular, after 96 hours ageing at 125° C.; the tin/0.7% copper/0.02% silicon alloy requires 0.05 joules to yield and 20.735 joules to break, whereas the conventional tin/lead alloy requires 0.038 joules to yield and 5.647 joules to break. By contrast, the conventional tin/copper alloy requires 0.018 joules to yield and 5.364 joules to break. A skilled person will appreciate that this alloy embodying the present invention will be significantly more stable over extended periods of time than the conventional tin/lead and tin/copper alloys.

Figure 9:
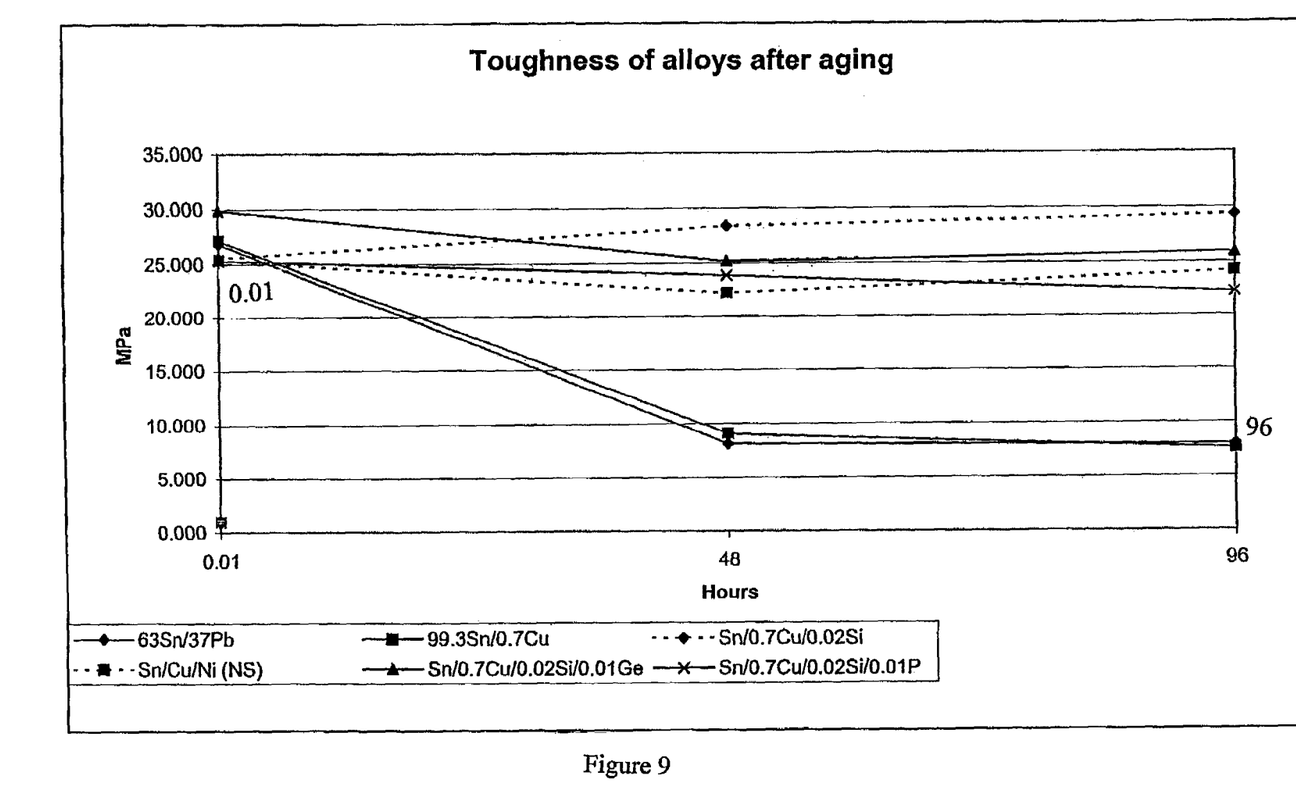
FIG. 9 is a graph showing the toughnesses of various alloys after being subjected to ageing processes of varying lengths.
Figure 12:
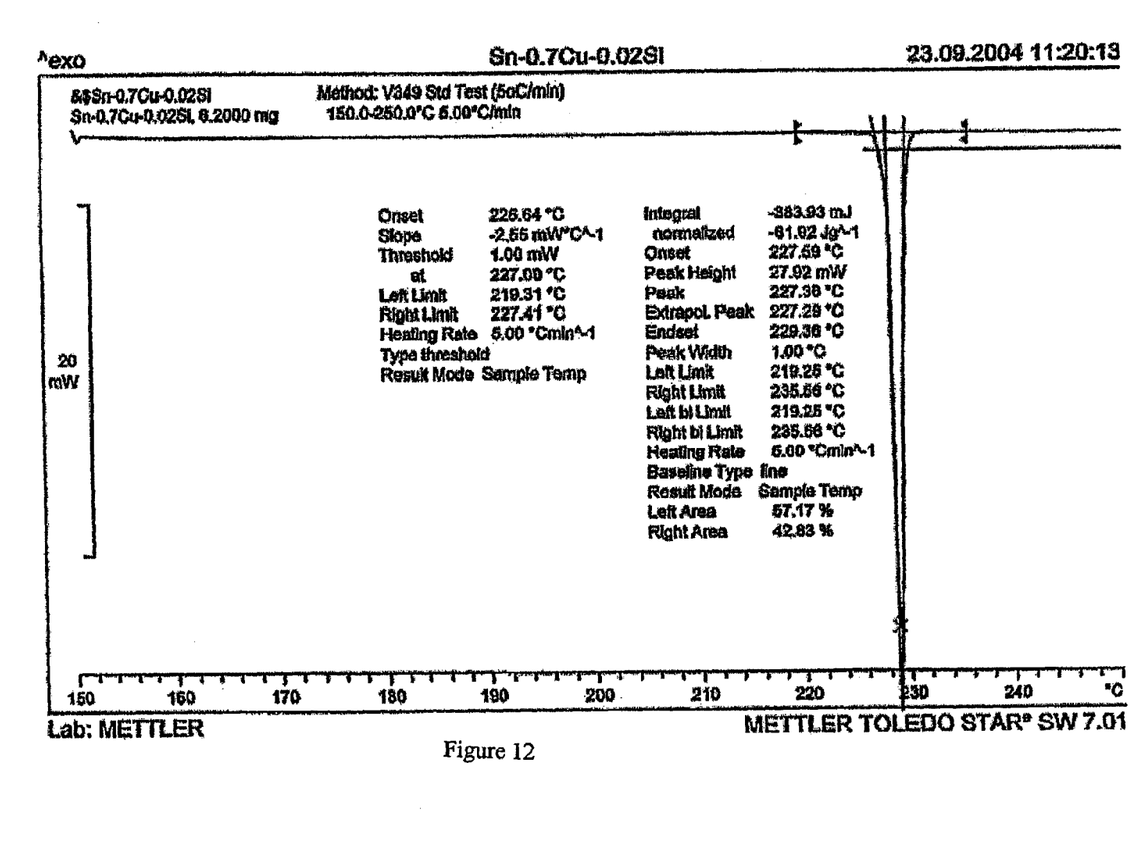
FIG. 12 is a differential scanning calorimeter curve of an alloy embodying the present invention.

FIG. 9 shows the toughnesses of various alloys after being subjected to the ageing process described above, and once again it can be seen that alloys embodying the present invention display superior toughnesses after ageing when compared to the conventional tin/lead and tin/copper solders.

It has also been found that the addition of silicon to a tin/copper solder alloy improves the mechanical properties of the alloy when the alloy is subjected to high temperatures. FIG. 10 shows the mechanical properties of the conventional tin/lead alloy, the conventional tin/copper alloy and the tin/ 0.7% copper/0.02% silicon alloy embodying the present invention when subjected to temperatures of 23° C., 75° C. and 125° C. While the UTS, YS (yield strength) strain percentages, energy to yield, energy to break and toughness of all of the alloys reduce under the influence of high temperature, the alloy embodying the present invention displays a lesser reduction in performance under these conditions. For example, the UTS of the conventional tin/lead alloy drops by around 71.2% when the temperature is increased from 23 C. to 125 C., but the UTS of the alloy embodying the present invention drops by only around 53.04% when the alloy is subjected to the same rise in temperature.

Turning to FIG. 11, this figure shows a table of the UTS, YS, strain percentage, energy to yield, energy to break and toughness of the conventional tin/lead alloy, the conventional tin/copper alloy and the tin/0.7% copper/0.02% silicon alloy embodying the present invention when various cross-head speeds are used in a tensile testing apparatus. It can be seen from the table that the alloy embodying the present invention displays significantly more stable mechanical characteristics under the various cross-head speeds when compared to the conventional alloys.

Referring to FIG. 9, this figure shows the different scanning calorimeter curve of the tin/0.7% copper/0.02% silicon alloy embodying the present invention, and it can be seen that the addition of silicon to this alloy has little or no effect on the melting temperature thereof. This alloy embodying the present invention therefore maintains the desirable wettability properties of the 99.3% tin/0.7% copper alloy, such as the wetting time and wetting force thereof.

Figure 13:
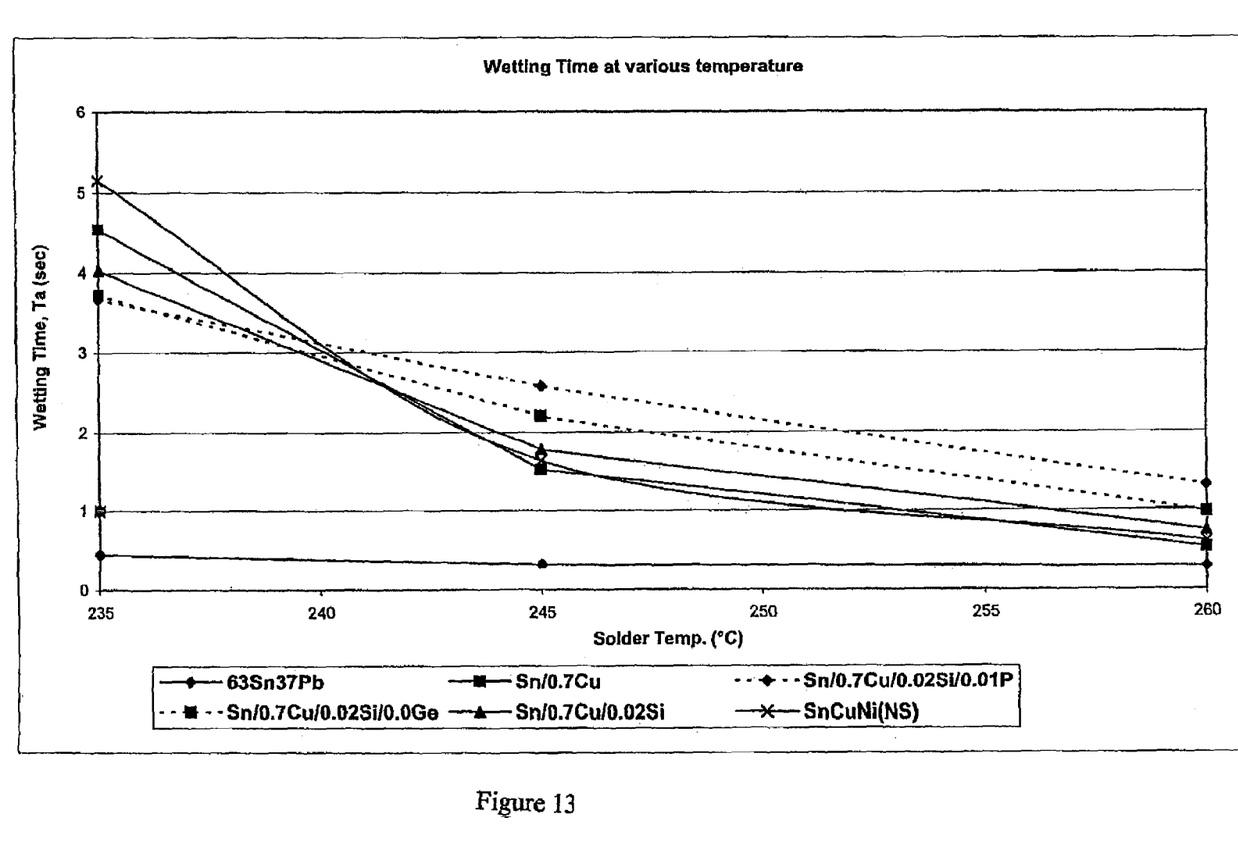
FIG. 13 shows the wetting time of various alloys at various temperatures.
Figure 14:
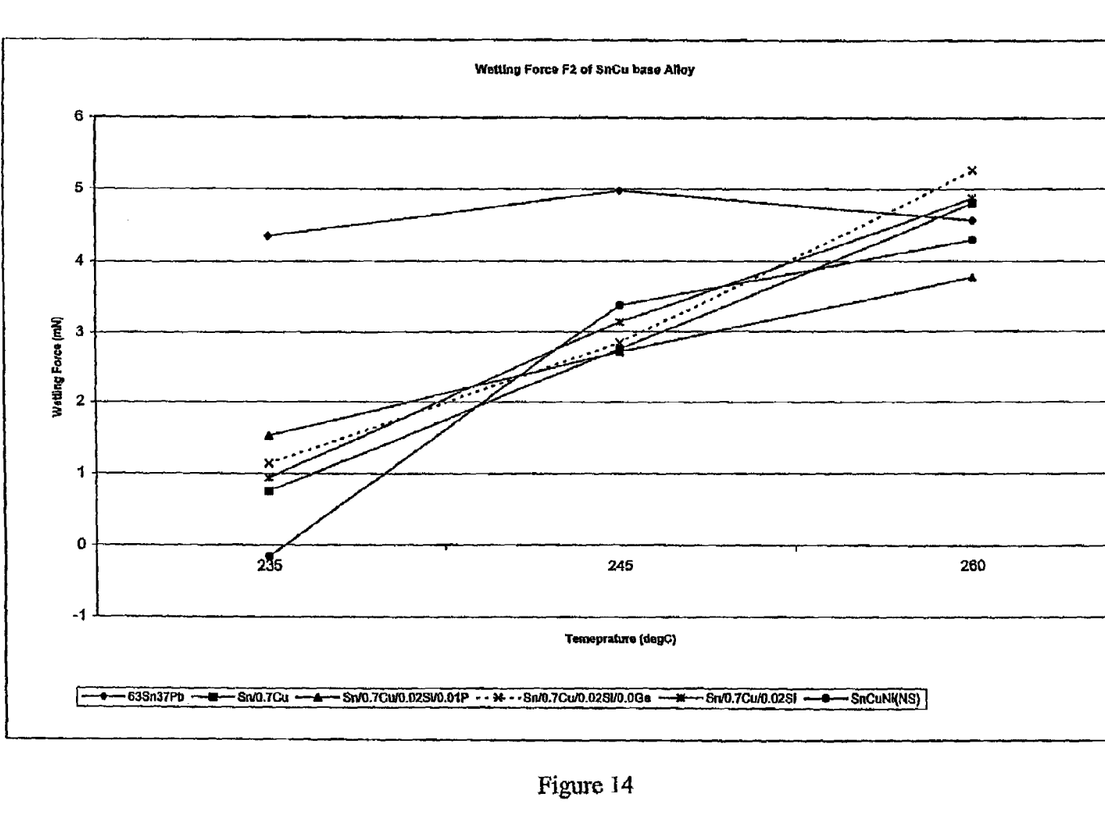
FIG. 14 shows the wetting forces of various alloys at various temperatures.

FIGS. 13 and 14 show the wetting times and wetting forces at certain temperatures of various alloys, and it can be seen that alloys embodying the present invention display very similar wetting characteristics to the conventional tin/copper alloy.

It will be appreciated by a skilled reader that the present invention provides substantially lead-free alloys having significantly improved properties when compared to conventional lead-free solders. It is envisaged that alloys embodying the present invention may be used as direct "drop-in" replacements for conventional leaded solders, particularly for use in wave soldering applications.

In the appended claims, the substantially lead-free solders claimed may consist essentially of the listed components, in other words may comprise only these components, aside from unavoidable impurities. This need not, however, necessarily be the case.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. A solder, consisting of:
   from 96.8% to 99.3% by weight tin;
   from 0.2% to 3.0% by weight copper;
   from 0.02% to 0.12% by weight silicon;
   optionally from 0.005% to 0.01% by weight phosphorous; and optionally from 0.005% to 0.01% by weight germanium, aside from unavoidable impurities.

2. A solder according claim 1, comprising:
   0.7% by weight copper; and
   0.02% by weight silicon.

3. A solder, consisting of:
   from 96.8% to 99.3% by weight tin;
   from 0.2% to 3.0% by weight copper;
   from 0.02% to 0.12% by weight silicon;
   0.01% by weight phosphorous; and
   optionally from 0.005% to 0.01% by weight germanium, aside from unavoidable impurities.

4. A solder, consisting of:
   from 96.8% to 99.3% by weight tin;
   from 0.2% to 3.0% by weight copper;
   from 0.02% to 0.12% by weight silicon;
   0.01% by weight germanium; and
   optionally from 0.005% to 0.01% by weight phosphorous, aside from unavoidable impurities.

5. A method of preparing a solder, consisting of the step of mixing tin, copper and silicon such that:
   the proportion of tin in the solder is from 96.8% to 99.3% by weight;
   the proportion of copper in the solder is from 0.2% to 3.0% by weight;
   the proportion of silicon in the solder is from 0.02% to 0.12% by weight; and
   optionally the method further comprising mixing from 0.005% to 0.01% by weight phosphorous in the solder mixture; and
   optionally the method further comprising mixing from 0.005% to 0.01% by weight germanium in the solder mixture,
   such that the resulting solder consists of only these elements, aside from unavoidable impurities.

6. A method according to claim 5, comprising the step of including 0.7% by weight copper and 0.02% by weight silicon in the solder mixture.

7. A method of preparing a solder, consisting of the step of mixing tin, copper, silicon and phosphorous such that:
   the proportion of tin in the solder is from 96.8% to 99.3% by weight;
   the proportion of copper in the solder is from 0.2% to 3.0% by weight;
   the proportion of silicon in the solder is from 0.02% to 0.12% by weight;
   the proportion of phosphorous is 0.01% by weight; and
   optionally the method further comprising mixing from 0.005% to 0.01% by weight germanium in the solder mixture,
   such that the resulting solder consists of only these elements, aside from unavoidable impurities.

8. A method of preparing a solder, consisting of the step of mixing tin, copper, silicon and germanium such that:
   the proportion of tin in the solder is from 96.8% to 99.3% by weight;
   the proportion of copper in the solder is from 0.2% to 3.0% by weight;
   the proportion of silicon in the solder is from 0.02% to 0.12% by weight;
   the proportion of germanium in the solder is 0.01% by weight; and
   optionally the method further comprising mixing from 0.005% to 0.01% by weight phosphorous in the solder mixture,
   such that the resulting solder consists of only these elements, aside from unavoidable impurities.

9. A method of soldering, consisting of the step of using a solder consisting of:
   from 96.8% to 99.3% by weight tin;
   from 0.2% to 3.0% by weight copper;
   from 0.02% to 0.12% by weight silicon,
   optionally from 0.005% to 0.01% by weight phosphorous; and
   optionally from 0.005% to 0.01% by weight germanium, aside from unavoidable impurities.

10. A method according to claim 9, which comprises using a solder having 0.7% by weight copper and 0.02% by weight silicon.

11. A method of soldering, consisting of the step of using a solder consisting of:
   from 96.8% to 99.3% by weight tin;
   from 0.2% to 3.0% by weight copper;

from 0.02% to 0.12% by weight silicon;
0.01% by weight phosphorous, and
optionally from 0.005% to 0.01% by weight germanium, aside from unavoidable impurities.

12. A method of soldering, consisting of the step of using a solder consisting of:
from 96.8% to 99.3% by weight tin;
from 0.2% to 3.0 by weight copper;
from 0.02% to 0.12% by weight silicon;
0.01% by weight germanium; and
optionally from 0.005% to 0.01% by weight phosphorous, aside from unavoidable impurities.

* * * * *